S. C. Bruce.
Mixing and Aging Liquors.

No. 98,226. Patented Dec. 28, 1869.

Witnesses:
Charles Nettleton
Nathaniel Gile

Inventor:

United States Patent Office.

SAMUEL C. BRUCE, OF NEW YORK, N. Y.

Letters Patent No. 98,226, dated December 28, 1869; antedated December 21, 1869.

IMPROVED APPARATUS FOR MIXING AND AGEING LIQUORS.

The Schedule referred to in these Letters Patent and making part of the same.

To all whom it may concern:

Be it known that I, SAMUEL C. BRUCE, of the city, county, and State of New York, have invented a certain new and useful Improvement in a Device for Mixing and Ageing Liquors, of which the following is a full, clear, and exact description, which will enable others skilled in the art to make and use the same, reference being had to the accompanying drawing, forming part of this specification.

The present invention relates to a new and useful improvement in a device for mixing and ageing liquors, by introducing the said liquor, under a heavy pressure, into a confined chamber, behind the dashers of a rotary beater, which will dash the said liquor around the chamber, and into a second chamber, upon the dashers of a second rotary beater, and, finally, the liquor is discharged through a spout in the second chamber, after having the oily globules thoroughly broken up, and mixed in with the body of the wine or spirits, the construction and operation of which will be understood from the following description, in which—

Similar letters of reference indicate corresponding parts.

Figure 1:
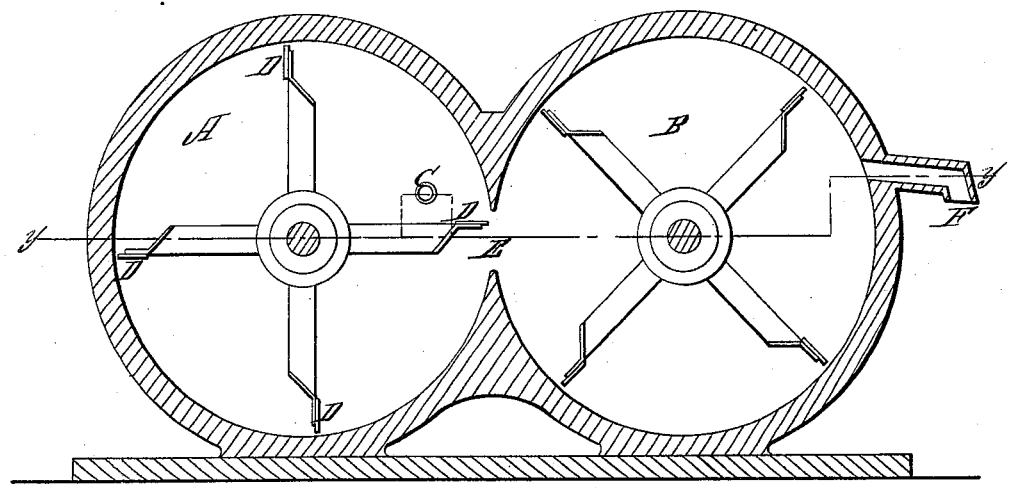
Figure 1 represents a sectional side elevation through the line x x.
Figure 2:
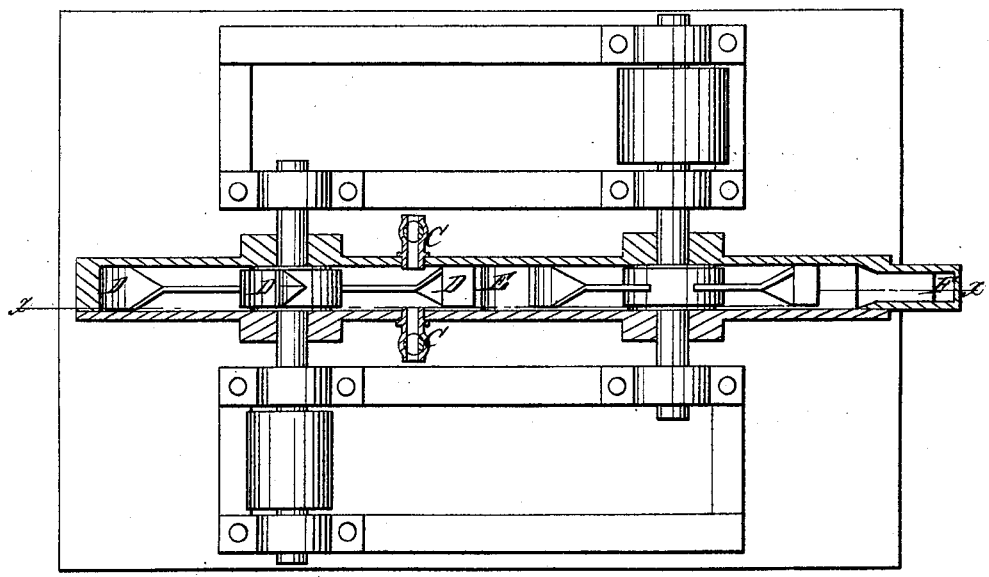
Figure 2 is a section of the same through the line y y.

In the case here presented, the letters A and B represent two chambers, constructed of iron, or other metal, or wood and iron combined.

The liquor is fed in from each side of the chamber A, through the apertures C C, which are provided with stop-cocks, for the purpose of regulating the flow.

The said apertures are placed so as to conduct the liquor against the shelving portion of the arms of the rotary beater, directly behind the tappets D.

The beater in the chamber A is made to revolve at a much greater speed than the beater in the chamber B.

Thus it will be seen that the liquor contained in the first chamber will be dashed, through the aperture E, into the second chamber, upon the rotary beater contained therein, which, in its turn, will dash the liquor around, until it finally finds its way out through the spout F.

Having thus described my invention,

What I claim as new, and desire to secure by Letters Patent, is—

1. The aperture E, formed by the cutting of the two circles, forming a connection between the chambers A and B, in the manner and for the purpose substantially as described.

2. Feeding the liquor in at the sides of the chamber A, behind the tappets D, substantially as described.

S. C. BRUCE.

Witnesses:
CHARLES NETTLETON,
NATHANIEL GILL.